(12) United States Patent
Ren et al.

(10) Patent No.: US 10,579,523 B2
(45) Date of Patent: Mar. 3, 2020

(54) FLUSHING IN FILE SYSTEM (71) Applicant: Microsoft Technology Licensing, LLC, Redmond, WA (US)

(72) Inventors: Jinglei Ren, Beijing (CN); Chieh-Jan Mike Liang, Beijing (CN); Thomas Moscibroda, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 15/514,780

(22) PCT Filed: Aug. 15, 2014

(86) PCT No.: PCT/CN2014/084556
§ 371 (c)(1),
(2) Date: Mar. 27, 2017

(87) PCT Pub. No.: WO2016/023236
PCT Pub. Date: Feb. 18, 2016

(65) Prior Publication Data
US 2018/0349275 A1 Dec. 6, 2018

(51) Int. Cl.
*G06F 12/00* (2006.01)
*G06F 12/0804* (2016.01)
(Continued)

(52) U.S. Cl.
CPC ...... *G06F 12/0804* (2013.01); *G06F 11/3438* (2013.01); *G06F 12/0868* (2013.01);
(Continued)

(58) Field of Classification Search
CPC ............. G06F 12/0804; G06F 12/0868; G06F 12/0871; G06F 16/1815; G06F 16/1865;
(Continued)

(56) References Cited

U.S. PATENT DOCUMENTS 6,681,293 B1   1/2004   Solomon et al.
6,854,115 B1   2/2005   Traversat et al.
(Continued)

FOREIGN PATENT DOCUMENTS

CN      1794243 A      6/2006
CN    103092786 A      5/2013
(Continued)

OTHER PUBLICATIONS

"European Patent Application Serial No. 14899800.8, Office Action dated Dec. 12, 2017", 8 pgs.
(Continued)

*Primary Examiner* — Shawn X Gu
(74) *Attorney, Agent, or Firm* — Schwegman Lundberg & Woessner, P.A.

(57) ABSTRACT

The subject matter described herein relates to a file system with adaptive flushing for an electronic device. The file system keeps data in memory much longer and its policy for flushing in-memory write cache to storage is application-aware and adaptive. More specifically, what parts of the cached data are ready for flushing could be determined according to the access characteristic of an application. In addition, when to do flushing can be selected flexibly at least partly based on user input interactions with an application of the electronic device or with the electronic device. Further, a multi-priority scheduling mechanism for scheduling data units that are ready to be flushed could be employed, which ensures fairness among applications and further improves flushing performance.

17 Claims, 4 Drawing Sheets

(51) Int. Cl.

| | |
|---|---|
| *G06F 16/172* | (2019.01) |
| *G06F 16/18* | (2019.01) |
| *G06F 16/23* | (2019.01) |
| *G06F 12/0868* | (2016.01) |
| *G06F 11/34* | (2006.01) |
| *G06F 12/0871* | (2016.01) |

(52) U.S. Cl.
CPC ........ *G06F 12/0871* (2013.01); *G06F 16/172* (2019.01); *G06F 16/1815* (2019.01); *G06F 16/1865* (2019.01); *G06F 16/2365* (2019.01); *G06F 2212/1016* (2013.01); *G06F 2212/1028* (2013.01); *G06F 2212/1044* (2013.01); *G06F 2212/171* (2013.01); *G06F 2212/502* (2013.01); *Y02D 10/13* (2018.01); *Y02D 10/34* (2018.01)

(58) Field of Classification Search
CPC ............... G06F 16/2365; G06F 16/172; G06F 11/3438; G06F 2212/1016; G06F 2212/1028; G06F 2212/1044; G06F 2212/171; G06F 2212/502; Y02D 10/34; Y02D 10/13
See application file for complete search history.

(56) References Cited

U.S. PATENT DOCUMENTS

| 7,165,129 | B1 | 1/2007 | Okmianski et al. |
|---|---|---|---|
| 2009/0157974 | A1* | 6/2009 | Lasser ................. G06F 12/0884 711/135 |
| 2010/0042773 | A1 | 2/2010 | Yeh |
| 2010/0274962 | A1 | 10/2010 | Mosek et al. |
| 2011/0119461 | A1 | 5/2011 | Desai et al. |
| 2011/0246503 | A1 | 10/2011 | Bender et al. |
| 2012/0143928 | A1 | 6/2012 | Yankov et al. |
| 2012/0284544 | A1 | 11/2012 | Xian et al. |
| 2014/0129765 | A1 | 5/2014 | Cho |

FOREIGN PATENT DOCUMENTS

| JP | 2006091995 | A | 4/2006 | |
|---|---|---|---|---|
| JP | 2010514038 | A | 4/2010 | |
| JP | 2011508347 | A | 3/2011 | |
| JP | 2012524952 | A | 10/2012 | |
| JP | 2013513186 | A | 4/2013 | |
| RU | 2238584 | C2 | 10/2004 | |
| RU | 2487398 | C1 | 7/2013 | |
| WO | 2008074830 | A2 | 6/2008 | |
| WO | WO-2008074830 | A2 * | 6/2008 | ......... G06F 12/0804 |

OTHER PUBLICATIONS

"European Patent Application Serial No. 14899800.8, Response filed Sep. 13, 2017 to Office Action dated Jul. 17, 2017", 24 pgs.
"International Application Serial No. PCT/CN2014/084556, International Preliminary Report on Patentability dated Mar. 2, 2017", 6 pgs.
"Data Consistency: Explained", Retrieved from http://recoveryspecialties.com/dc01.html, Sep. 2013, 2 Pages.
"FAQ", Retrieved From https://btrfs.wiki.kernel.org/index.php?title=FAQ&oldid=16151, Jan. 4, 2013, 17 Pages.
"The Open Group Base Specifications" Issue 7", In IEEE Std 1003.1, 2018 Edition", Jan. 2018, 2 Pages.
"Office Action Issued in Russian Patent Application No. 2017104495", dated May 18, 2018, 8 Pages.
Andersen, et al., "FAWN: A Fast Array of Wimpy Nodes", In Proceedings of the ACM SIGOPS 22nd Symposium on Operating Systems Principles, Oct. 11, 2009, 17 Pages.
Anderson, et al., "Serverless Network File Systems", In Proceedings of the Fifteenth ACM Symposium on Operating Systems Principles, Dec. 3, 1995, 21 Pages.
Bailis, et al., "Probabilistically Bounded Staleness for Practical Partial Quorums", In Proceedings of the VLDB Endowment, vol. 5, Issue 8, Apr. 1, 2012, pp. 776-787.
Brouwer, A, "Sysfs and kobjects", Retrieved from https://www.win.tue.nl/~aeb/linux/lk/lk-13.html, Jan. 2003, pp. 1-7.
Carroll, et al., "An Analysis of Power Consumption in a Smartphone", In Proceedings of the USENIX Conference on USENIX Annual Technical Conference, Jun. 2010, 14 Pages.
Chen, et al., "The Rio File Cache: Surviving Operating System Crashes", In Proceedings of the ACM SIGPLAN Notices, vol. 31, Issue 9, Oct. 1, 1996, 11 Pages.
Chidambaram, et al., "Consistency without Ordering", In Proceedings of the 10th USENIX Conference on File and Storage Technologies, Feb. 14, 2012, 16 Pages.
Chun, et al., "Mobius: Unified Messaging and Data Serving for Mobile Apps", In Proceedings of the 10th International Conference on Mobile Systems, Applications, and Services, Jun. 2012, 13 Pages.
Community, L, "Ext4 (and ext2/ext3)", Retrieved from https://ext4.wiki.kernel.org, Jan. 2013, 2 Pages.
Dai, et al., "Elf: An Efficient Logstructured Flash File System for Micro Sensor Nodes", In Proceedings of the 2nd International Conference on Embedded Networked Sensor Systems, Jan. 2004, 12 Pages.
Decandia, et al., "Dynamo: Amazon's Highly Available Key-value Store", In Proceedings of Twenty-first ACM SIGOPS Symposium on Operating Systems Principles, Oct. 14, 2007, pp. 205-220.
Dewitt, et al., "Implementation Techniques for Main Memory Database Systems", In Proceedings of the SIGMOD International Conference on Management of Data, Jun. 18, 1984, 8 Pages.
Frost, et al., "Generalized File System Dependencies", In Proceedings of Twenty-first ACM SIGOPS Symposium on Operating Systems Principles, Jan. 2007, 14 Pages.
Goda, et al., "Power-Aware Remote Replication for Enterprise-level Disaster Recovery Systems", In USENIX Annual Technical Conference, Jan. 2008, pp. 255-260.
Hagmann, R, "Reimplementing the Cedar File System Using Logging and Group Commit", In Proceedings of the Eleventh ACM Symposium on Operating Systems Principles, Jan. 1987, pp. 155-162.
Hitz, et al., "File System Design for an NFS File Server Appliance", Retrieved from http://www.netapp.com/library/tr/3002.pdf, Retrieved on: Aug. 9, 2007, 13 Pages.
Kim, et al., "Adaptive Logging for Mobile Device", In Proceedings of VLDB Endowment, vol. 3, Issue 1-2, Sep. 2010, 12 Pages.
Kim, et al., "Revisiting Storage for Smartphones", In Proceedings of the 10th USENIX Conference on File and Storage Technologies, Jan. 2012, 25 Pages.
Kim, et al., "What is a Goodbuffer Cache Replacement Scheme for Mobile Flash Storage?", In Proceedings of the 12th ACM Slgmetrics/Performance Joint International Conference on Measurement and Modeling of Computer Systems, Jan. 2012, 12 Pages.
Koller, et al., "Write Policies for Host-Side Flash Caches", In Proceedings of the 11th USENIX Conference on File and Storage Technologies, Jan. 2013, pp. 45-58.
Lee, et al., "Smart Layers and Dumb Result: Io Characterization of an Android-based Smartphone", In Proceedings of the Tenth ACM International Conference on Embedded Software, Jan. 2012, pp. 23-32.
Lee, E, et al., "Unioning of the Buffer Cache and Journaling Layers with Non-Volatile Memory", In Proceedings of the 11th USENIX Conference on File and Storage Technologies, Jan. 2013, pp. 73-80.
Lv, et al., "Operation-aware Buffer Management in Flash-based Systems", In Proceedings of the ACM SIGMOD International Conference on Management of Data, Jun. 12, 2011, pp. 13-24.
Mathur, et al., "Capsule: An Energy-optimized Object Storage System for Memory-constrained Sensor Devices", In Proceedings of the 4th International Conference on Embedded Networked Sensor Systems, Jan. 2006, 14 Pages.

(56) References Cited

OTHER PUBLICATIONS

Narayanan, et al., "Write off-loading: Practical Power Management for Enterprise Storage", In Proceedings of the 6th USENIX Conference on File and Storage Technologies, Jan. 2008, pp. 253-267.
Ongaro, et al., "Fast Crash Recovery in RAMCloud", In Proceedings of the Twenty-Third ACM Symposium on Operating Systems Principles, Oct. 23, 2011, pp. 29-41.
Papathanasiou, et al., "Energy Efficiency through Burstiness", In Proceedings of 5th IEEE Workshop on Mobile Computing Systems and Applications, Oct. 2003, 10 Pages.
Park, et al., "Cflru: A Replacement Algorithm for Flash Memory", In Proceedings of the International Conference on Compilers, Architecture and Synthesis for Embedded Systems, Jan. 2006, 8 Pages.
Ports, et al., "Transactional Consistency and Automatic Management in an Application Data Cache", In Proceedings of the 9th USENIX Conference on Operating Systems Design and Implementation, Oct. 4, 2010, 14 Pages.
Rusling, D A., "Linux Data Structures", Retrieved from http://www.tldp.org/LDP/tlk/ds/ds.html, Jan. 1999, 15 Pages.
Satyanarayanan, et al., "Lightweight Recoverable", In Proceedings of the Fourteenth ACM Symposium on Operating Systems Principles, Jan. 1993, 15 Pages.
Volos, et al., "Mnemosyne:lightweight persistent memory", In Proceedings of the sixteenth international conference on Architectural support for programming languages and operating systems, 2011, 13 Pages.
Weissel, et al., "Cooperative i/o: A Novel i/o Semantics for Energy-aware Applications", In Proceedings of the 5th Symposium on Operating Systems Design and Implementation,Jan. 2002, 13 Pages.

Wu, et al., "Envy: A Non-Volatile, Main Memory Storage System", In Proceedings of the Sixth International Conference on Architectural support for Programming Languages and Operating Systems, Nov. 1, 1994, pp. 86-97.
Xu, et al., "Optimizing Background Email Sync on Smartphones", In Proceeding of the 11th Annual International Conference on Mobile Systems, Applications, and Services, Jun. 25, 2013, pp. 55-68.
Yu, et al., "Design and Evaluation of a Continuous Consistency Model for Replicated Services.", In Proceedings of the 4th Conference on Symposium on Operating System Design & Implementation, vol. 4, Jan. 2000, 14 Pages.
Zhang, et al., "Trading Replication Consistency for Performance and Availability: An Adaptive Approach", In Proceedings of the 23rd International Conference on Distributed Computing Systems, May 19, 2003, 9 Pages.
"Office Action Issued in European Patent Application No. 14899800.8", dated Jul. 17, 2017, 7 Pages.
"Search Report Issued in European Patent Application No. 14899800.8", dated Jul. 6, 2017, 4 Pages.
"International Search Report and Written Opinion Issued in PCT Application No. PCT/CN2014/084556", dated May 19, 2015, 11 Pages.
"Office Action Issued in Japanese Patent Application No. 2017-502189", dated Aug. 13, 2018, 13 Pages.
"Summons to attend Oral Proceedings Issued in European Application No. 14899800.8", Mailed Date: Feb. 7, 2019, 13 Pages.
"Office Action Issued in Mexican Patent Application No. MX/a/2017/002051", dated Jun. 20, 2019, 8 Pages.

* cited by examiner

FLUSHING IN FILE SYSTEM

CROSS-REFERENCE TO RELATED APPLICATIONS

This application is a U.S. National Stage Filing under 35 U.S.C. 371 of International Patent Application Serial No. PCT/CN2014/084556, filed Aug. 15, 2014, and published as WO 2016/023236 A1 on Feb. 18, 2016, which application and publication are incorporated herein by reference in their entirety.

BACKGROUND

In computing systems, a file system is used to control how data is stored and retrieved. The file system manages user data in storage media. There are many different kinds of file systems, for example, disk file systems, network file systems, and special-purpose file systems. Each one may have different structure and logic, properties of speed, flexibility, security, size and more. A file system involves various aspects including e.g., space management, maintaining integrity.

Most file systems are designed for personal computer (PC)-class systems. Generally, there are two main file system requirements for PC-class systems, reliability and read/write throughput. Reliability keeps data safe with guaranteed consistency and durability. Reliability particularly relates to data loss in case of an unexpected system crash (e.g., power failure). Read/write throughput relates to the input/output (I/O) responsiveness of user applications.

SUMMARY

However, current users of non-PC devices, including but not limited to portable or mobile devices such as a smart phone, a tablet computer, a portable digital assistant (PDA) and the like, and some small type fixed devices, experience non-responsiveness of applications and high energy depletion caused by data storage and the underlying traditional file system. Such non-PC devices present significantly different challenges for a file system due to some fundamentally different limitations and usage scenarios. In one aspect, these devices normally have limited energy due to being battery-powered and thus energy drain should be as low as possible. In another aspect, the user experience of a highly-responsive application interaction drives the success of the applications in a mobile ecosystem to a great extent. Thus, it may be desirable for a file system suitable for such devices to be energy efficient and highly responsive.

Embodiments of the subject matter described herein generally relate to a file system with the ability to adaptively store to, write to, or flush to, storage for an electronic device. Normally, data to be written will be stored in a buffer area within a memory, instead of being written to persistent storage directly. A flushing operation includes refreshing the buffer area by writing or storing data currently residing in the buffer area to a persistent storage and clearing the buffer area associated with the written data. In order to achieve energy efficiency or high responsiveness, the following ways could be adopted: reducing the amount of data to be flushed to a persistent storage, because the amount of data to be flushed is one of the dominate factors determining write energy efficiency; and/or reducing the application wait time on storage I/O completion, in other words, the amount of time that a user of an application must wait until the application becomes responsive. To that end, a large-scale and long-lived caching on device random access memory (RAM) can be employed in order to reduce the amount of data that needs to be flushed to a persistent storage and to reduce the application wait time on storage I/O completion.

Policies of the file system for flushing in-memory write cache to storage may be application-aware and/or adaptive. The policies may be at least partly based on one or more of the following: an access characteristic of an application, a state of user interaction with the electronic device, and a state of the electronic device. More specifically, a block of cached write request sequences ready to be flushed could be determined according to the access characteristics of an application. In addition, flushing timing can be selected flexibly, such that the flushing does not impact the device energy consumption and the application responsiveness. For instance, a state when the electronic device is idle may be an appropriate time to perform the flushing as it may result in less impact on application responsiveness.

It is to be understood that this Summary is provided to introduce a selection of concepts in a simplified form. The concepts are further described below in the Detailed Description. This Summary is not intended to identify key features or essential features of the claimed subject matters, nor is it intended to be used to limit the scope of the claimed subject matters.

Advantages may become apparent from the following detailed description when taken in conjunction with the drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
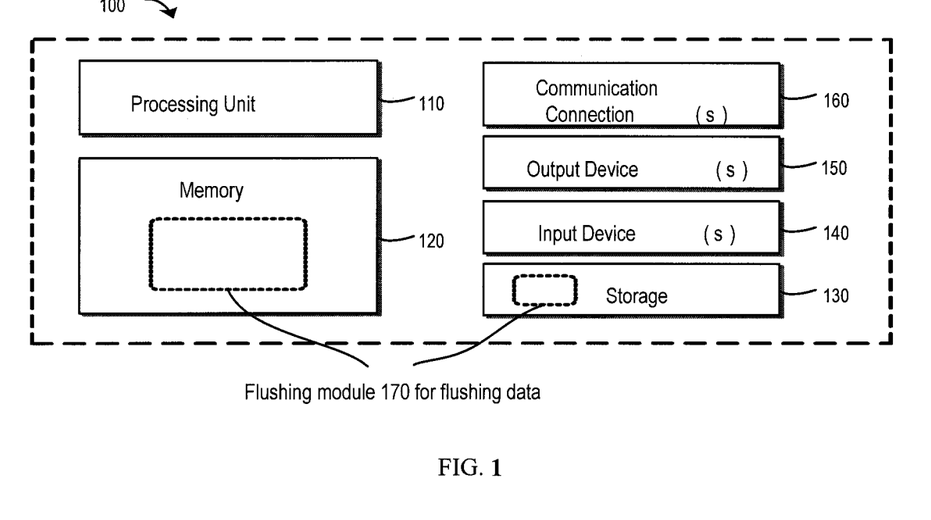
FIG. 1 illustrates a block diagram of a computing environment in which embodiments of the subject matter described herein may be implemented.

FIG. 1 illustrates an example of a computing environment 100 in which one or more embodiments of the subject matter described may be implemented. The computing environment 100 is not intended to suggest any limitation as to scope of use or functionality of the subject matter described herein, as various embodiments may be implemented in diverse general-purpose or special-purpose computing environments.

With reference to FIG. 1, the computing environment 100 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores at least a part of instructions for a flushing module 170 for flushing in a file system.

A computing environment 100 may have additional component or features. In the example shown in FIG. 1, the computing environment 100 includes storage 130, one or more input devices 140, one or more output devices 150, and one or more communication connections 160. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 130 may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment 100. The storage 130 may store at least a part of instructions for the flushing module 170.

It should be noted that, the flushing module 170 may take the form of an entirely hardware implementation, an entirely software implementation (including firmware, resident software, micro-code, etc.) or an implementation combining software and hardware aspects that may all generally be referred to herein as a "module" or "mechanism". Furthermore, aspects of the flushing module 170 may take the form a computer program product embodied in one or more computer readable medium(s) having computer readable program instructions embodied thereon. The instructions for the flushing module 170 may be contained entirely in the memory 120, entirely in the storage 130, or partly in the memory 120 and partly in the storage 130 in communication with the memory 130.

The input device(s) 140 may be one or more of various different input devices. For example, the input device(s) 140 may include a user device such as a mouse, keyboard, trackball, etc. The input device(s) 140 may implement one or more natural user interface techniques, such as speech recognition, touch and stylus recognition, recognition of gestures in contact with the input device(s) 140 and adjacent to the input device(s) 140, recognition of air gestures, head and eye tracking, voice and speech recognition, sensing user brain activity, and machine intelligence. As other examples, the input device(s) 140 may include a scanning device; a network adapter; a CD/DVD reader; or another device that provides input to the computing environment 100. The output device(s) 150 may be a display, printer, speaker, CD/DVD-writer, network adapter, or another device that provides output from the computing environment 100. The input device(s) 140 and output device(s) 150 may be incorporated in a single system or device, such as a touch screen, a virtual reality system, a wearable computing device including a head mounted device.

The communication connection(s) 160 enables communication over a communication medium to another computing entity. Additionally, functionality of the components of the computing environment 100 may be implemented in a single computing machine or in multiple computing machines that are able to communicate over communication connections. Thus, the computing environment 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments of the subject matter can be described in the general context of computer-readable media, which may be storage media or communication media. Computer-readable storage media are any available storage media that can be accessed within a computing environment, but the term computer-readable storage media does not refer to transitory propagating signals per se or other signals per se. By way of example, and not limitation, with the computing environment 100, computer-readable storage media include memory 120, storage 130, and combinations thereof.

Embodiments of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

Although the flushing mechanism disclosed herein may be beneficial for portable or mobile devices including but not limited to smart phones, those skilled in the art could appreciate that, the flushing mechanism can also be implemented in other non-mobile devices such as PCs. Thus, the above described computing environment 100 could be implemented in various computing devices, including but not limited to, mobile or portable devices such as a smart phone, a tablet computer, a portable digital assistant (PDA), wearable computing devices including head mounted devices, and the like, and non-mobile devices such as desktops and servers, or some small type fixed devices. For illustrative and simplified purposes, it is described below in the context of electronic devices such as smart phones.

In the following description, "data consistency" used herein refers to an aspect of maintaining data versions in the presence of a system crash. More particularly, point-in-time consistency is used, which means that the data in a persistent storage always corresponds to the data at a point of time in the write history or in the write cache, so that any write before the time has reached the storage and any write after it does not. "Data staleness" as used herein means the distance between the current in-memory data and the persistent data in the storage. Intuitionally, data staleness is how far it goes back to recover after a system crash. In other words, data staleness is the distance between the current memory data and the persistent data in a persistent storage. Data staleness could be measured by many metrics, such as time or versions. In this context, data staleness is measured by the total amount of data that has not yet been flushed to a persistent storage. "Data durability" is a property which guarantees that data committed will survive permanently. Durability can be achieved by flushing data in the memory to non-volatile or persistent storage. A "transaction" used herein refers to a set of one or more individual operations.

As mentioned previously, traditional file systems use two ways to confine data staleness and guarantee consistency while improving I/O performance. First, dirty bits, or bits that have not yet been written to persistent memory, are written from the memory to persistent storage after a small fixed time-interval. A journaling file system is a kind of disk file system which keeps track of the changes that will be made in a journal before committing them to a persistent storage. To confine data staleness and maintain consistency, a regular journaling file system flushes in-memory write cache to persistent storage periodically, or enforces a flush for each file synchronization (sync). In the event of a system crash or power failure, such file systems are quicker to bring back online and less likely to become corrupted. For example, the default Linux Ext4 does flushing every 5 seconds, i.e., a user loses at most 5 seconds of history after a system crash. Second, the file synchronization (denoted as "fsync") interface provides a way to guarantee consistency. The write operations are first outputted to a separate log without affecting the main database file in a persistent storage, and then fsync is invoked over the log. Finally, the logged changes are converted to the main database file.

However, the periodical flushing in traditional file systems and file synchronization has significant implications on application responsiveness and energy efficiency. When issuing an fsync, the application in the device has to wait until all data is written to storage. Frequent flushes, each of which may incur significant CPU utilization, can delay the system and substantially impact the device's energy consumption either directly or indirectly.

Various aspects of the technology described herein are generally directed towards a file system with adaptive flushing for an electronic device. In order to achieve energy efficiency or high responsiveness, the following ways could be adopted: reducing the amount of data to be flushed to a persistent storage; and/or reducing the application wait time on storage I/O completion.

It is found that, a write operation consumes more energy than a read operation, while the amount of data to be flushed is a dominate factor determining write energy efficiency. If some data remains in the memory and is overwritten more than once, the overwritten data need not be flushed, which results in energy savings. Studies show that different applications have vastly different data read/write access patterns. For example, one application may frequently write to a same address in the memory, while another application may always write different addresses in the memory. Such different data read/write access patterns could indicate different energy efficiency improvement potentials. In other words, a block of cached write request sequences ready for flushing can be determined based on the specific write patterns of an application. Take the above described applications as examples. For the application which frequently writes data to a same address in the memory, write request sequences associated with this application occurring during a long period can be determined as a block of cached write request sequences ready for flushing. During the long period, the written data relating to the write request sequences can be kept in the memory and data in a place addressed frequently by the write request sequences is frequently overwritten. Thus, the data to be flushed can be reduced as much as possible. The length of the long period can be determined by the write pattern of this application varying as time. As compared, for the application which always writes different addresses in the memory, write request sequences associated with this application occurring during any short period can be determined as a block of cached write request sequences ready for flushing, because there is few overwriting as indicated by the write pattern of this application and it has little space to reduce to data to be flushed. In this way, it is possible to reduce the amount of data to be flushed based on different application access characteristics and thereby achieve energy efficiency. In this regard, the flushing mechanism has application-adaptability. Details for determining a block of cached write request sequences ready for flushing based on the specific write patterns of an application will be described later, for example with reference to FIG. 3 and step 430 in FIG. 4.

Additionally, many appropriate mechanisms could be applied in order to guarantee consistency. For example, transaction processing could be applied in the write cache. Transaction processing links multiple individual operations in a single, indivisible transaction, and ensures that either all operations in a transaction are completed without error, or none of them are. If some of the operations are completed but errors occur when the others are attempted, the transaction-processing system "rolls back" all of the operations of the transaction, including the successful ones, thereby erasing all traces of the transaction and restoring the system to the consistent, known state that it was in before processing of the transaction began. If all operations of a transaction are completed successfully, the transaction is committed by the system, and all changes to the data file are made permanent; the transaction cannot be rolled back once this is done.

The transaction processing mechanism could be combined with the above described application-aware mechanism in order to provide both data consistency and energy efficiency. In some implementations, the division of operations such as cached write request sequence into transactions could be application-aware, that is, depending on a data read/write access pattern of an application.

In another aspect, flushing timing can be selected flexibly, such that the flushing does not impact the device energy consumption and the application responsiveness. In general, when the electronic device is idle, it is an appropriate timing to do the flushing which has less impact on the application responsiveness.

A large-scale and long-lived caching on device random access memory (RAM) can be employed in order to reduce the amount of data that needs to be flushed to a persistent storage and to reduce the application wait time on storage I/O completion. In some instances write performance and energy efficiency may be preferred in favor of data durability and data staleness for the following reasons. First, the random access memory (RAM) on modern capacity has grown significantly. For example, 2 GB is the standard today. Second, modern smart phones have a battery power supply. This kind of battery-backed RAM (BBRAM) is regarded as reliable in a normal PC or server setting. Third, most application data is retrievable even after loss. If, for example, an email is lost, it can simply be reloaded from the server; and the same is true with other popular applications such as social networking applications, digital maps, etc. Therefore, even in the worst case of a memory loss, the data can simply be re-loaded from a remote server. Thus, it may be feasible and beneficial to tradeoff data durability for performance, i.e., to risk somewhat increased data staleness, given that the resulting potential for improving energy efficiency and responsiveness may be substantial.

In general, compared with traditional file systems, the file system according to some aspects of this disclosure releases flushes from static small intervals or file synchronizations, keeps data in memory much longer and its policy for flushing in-memory write cache to storage is application-aware and adaptive. The policy is at least partly based on one or more of the following: an access characteristic of an application, a state of user interaction with the electronic device, and a state of the electronic device. More specifically, what parts of the cached data are ready for flushing, i.e., a block of cached write request sequence that is ready to be flushed, could be determined according to the access characteristic of an application. In addition, the flushing timing, which indicates when the flushing is performed, can be selected flexibly at least partly based on user input interactions with an application of the electronic device or with the electronic device. Further, a multi-priority scheduling mechanism for scheduling data units that are ready to be flushed could be employed, which ensures fairness among applications and further improves flushing performance.

Figure 2:
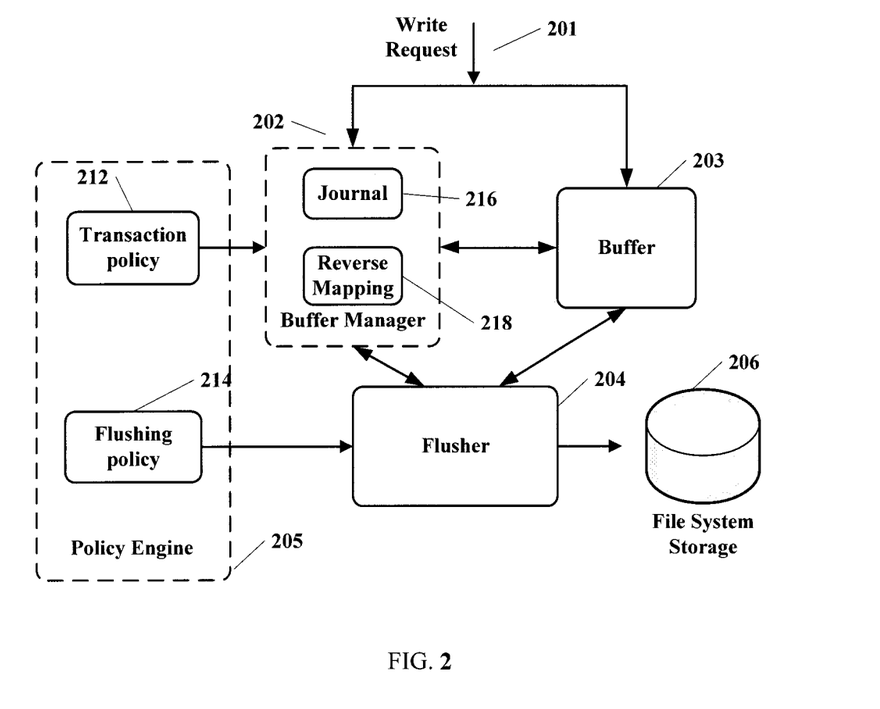
FIG. 2 illustrates a schematic block diagram showing example components for implementing flushing in a file system.

FIG. 2 illustrates a schematic block diagram showing example components for implementing flushing in a file system. The flushing mechanism as disclosed herein can be incorporated with any appropriate file system, no matter currently known or developed in the future, in order to complement the file system. Although some embodiments will be discussed in connection with some certain component in the following, this is only for the purpose of illustration without suggestion of any limitations on the scope of the subject matter described herein.

With reference to FIG. 2, five major components involved in flushing in a file system may comprise a buffer manager 202, a buffer 203, a flusher 204, a policy engine 205, and a file system storage 206.

The buffer manager 202 may be configured to manage buffering of data. The buffer manager 202 can be used to implement the application-aware mechanism as disclosed herein. The buffer manager 202 manages and keeps data in the buffer 203 much longer in order to gain energy improvement opportunities. To this end, the buffer manager 202 can be configured to organize buffered data into sections that are ready for flushing according to a transaction policy 212 as provided by the policy engine 205. Many appropriate manners can be used by the buffer manager 202 to achieve this object. In some aspects, the buffer manager 202 may comprise a journal component 216 and a reverse mapping component 218.

The journal component 216 may be configured to maintain a journal, also called a write log or a write-ahead log. In the basic form, a journal is a chronological record of all write requests 201 from an application to maintain a write history of the application. For simplicity, in the following description, the journal component 216 can be called "journal" for short. The journal 216 is a special area allocated by the file system to record the changes it will make ahead of time. After a crash, recovery simply involves reading the journal 216 from the file system and replaying changes from this journal 216 until the file system is consistent again.

The journal 216 could be implemented in many appropriate manners. Some file systems allow the journal to grow, shrink and be re-allocated just as a regular file, while others put the journal in a contiguous area or a hidden file that is guaranteed not to move or change size while the file system is mounted. Some file systems may also allow external journals on a separate device, such as a solid-state disk or battery-backed non-volatile RAM. Changes to the journal may themselves be journaled for additional redundancy, or the journal may be distributed across multiple physical volumes to protect against device failure. The disclosure herein has no limitation in this regard.

Log entries in the journal 216 correspond to respective write requests 201 and reference to respective addresses in the buffer 203 associated with the write requests 201. As mentioned previously, whether a block of cached write request sequence is ready for flushing can be determined specific to an application, i.e., application-aware. In one implementation, log entries in the journal 216 could be organized to prepare blocks of cached write request sequence that are ready for flushing, according to a transaction policy 212 as provided by the policy engine 205. For example, the journal 216 can be divided into an active or open section and a closed section, which defines the scope of flushing. In an active section, a new log entry could be inserted and some performance improvement means such as overwriting and reordering is allowable. In this example, log entries in an active section may not be prepared for flushing. In a closed section, new log entries may not be allowed to add and performance improvement means such as overwriting and reordering are prohibited. In other words, closed sections are used for keeping different versions of cached data. All log entries in a closed section of the journal 216 are ready for flushing, waiting for being scheduled to flush to storage. In one embodiment, the storage includes persistent storage such as the file system storage 206. In some embodiments, determining what parts of cached data are ready for flushing, i.e., the closing of a section, could follow the transaction policy 212 which is at least partly based on access characteristics of an application, more specifically, based on data read/write access pattern of an application, thereby improving the write throughput and energy efficiency. The details of the transaction policy 212 will be elaborated later.

Additionally, many appropriate mechanisms could be applied in order to guarantee consistency. For example, transaction processing could be applied in the write cache. The transaction processing mechanism could be combined with the above described application-aware mechanism in order to provide both data consistency and energy efficiency. In such embodiments, the division of operations such as cached write request sequence into transactions could be application-aware, that is, depending on a data read/write access pattern of an application. Thus, the sections in the journal 216 can also be called transactions.

As can be appreciated, there might be several closed sections or transactions waiting to be flushed. In other words, the journal 216 could have different versions of a cached page. For illustrative and simplified purposes, a versioned cache transaction (VCT) may be used to capture this information. Normally, a VCT goes through three states in its lifetime: when it is open or active, it covers the entries in the active section and can continuously include newly appended entries; when it is closed, its ending position is fixed, and all its entries are put into the closed section; and when it is committed, the flusher 204 picks it and writes all its entries to persistent storage atomically. Afterwards, the transaction and its entries are deleted by the file system. Some performance improvement means such as overwriting and reordering are only allowed within the scope of a single transaction. As the flusher 204 will guarantee the durability and atomicity of a committed transaction, these improvements will not leave any inconsistent state.

The journal 216 can be embodied as many appropriate forms, including but not limited to a circular array, a list, or some other forms. In some embodiments, each application may have its own journal and thus a journal for an application may have a single active section. When the journal 216 is embodied as a circular array, new log entries can be appended in the single active section at the end of the journal. In some implementations, the tail of the circular array can be protected by a spinlock to reduce the processing time of new entries. In addition, the head of the circular array could be protected by a mutex that only postpones write requests when the tail grows to reach the head. A mutex is a flag which guarantees that at any time, only one thread can access an object (in this example, the head of the circular array) corresponding to the mutex.

The journal 216 could also embed some other data structures to provide additional improvements. As an example, a kobject structure (a basic building blocks of file system hierarchy) could be embedded, such that the file system can export user-space interfaces as a file under the /sys directory. At least two benefits could be achieved by such a kobject structure. First, users can easily check and set basic properties of each journal. Second, it supports parallel writes by distinguishing between flushing and appending because two locks have be used to protect the head and the tail of the journal 216.

The reverse mapping component 218 can be configured to maintain a reverse mapping from a referenced cache unit of the buffer 203 to a log entry within the journal 216. The reverse mapping could be used for two purposes. First, when deleting data in a cache unit from the buffer 203, this reverse mapping could be used to locate the corresponding entry and mark it as invalid. Second, when a new write comes, it can be used to check whether the target cache unit has been referenced by an entry and if so, determine which entry references it. This information can be used to by the buffer manager 202 to organize the buffered data. An exemplary processing will be described later.

The reverse-mapping component 218 can be implemented in many suitable forms. One approach to implement it includes a customized hash table, which uses a reader-writer lock for each bucket instead of a system-wide lock. Pages associated with entries have its count field incremented so that the page cache will not evict them. This also means the file system must release pages before memory space runs low, to avoid out-of-memory problems. Another approach to implement the reverse-mapping is adding a reference pointer to the page structure. Since struct page is already packed with many fields (e.g., 24+ flags reside in a 32-bit variable), this approach requires enlarging the variable size.

The buffer 203 is the main form of storing file data in memory and serving user requests. The buffer 203 is used to host a portion of file data in a volatile memory to improve I/O performance. The buffer 203 can be implemented by any kind of volatile memory including but not limited to dynamic RAM (DRAM) and static RAM (SRAM). In some embodiments, a cache can be used to buffer the data to be written. Normally, the operating system (OS) mostly manages memory in pages, for example in Linux systems. For illustrative and simplified purposes, the term "page cache" will be used hereinafter to represent the buffer 203, and a cache page refers to a managed unit in the cache. However, the skilled in the art could appreciate that the memory can be managed in any other appropriate units than pages, and the disclosure herein has no limitation in this regard. The page cache 203 could be any existing page caches shared with OS and/or other mounted file systems or a page cache allocated specifically for the flushing mechanism disclosed herein.

If a cache page has been written or modified, it will be marked as dirty, which indicates that the cache page has been modified and has not yet been saved to storage. A page cache of large capacity has an advantage to support long-lived memory caching, thereby providing opportunities for improving energy efficiency and application responsiveness.

The flusher 204 is a communication mechanism that manages data flow between volatile memory and non-volatile storage. The flusher 204 may have two responsibilities. First, it invokes an underlying storage component that manages the persistent storing of data to storage. Second, when a file system is loaded, the flusher 204 checks a target partition and attempts recovery of any data inconsistency.

When some cache pages in the page cache 203 are dirty, the flusher 204 takes charge of writing back the page data to persistent storage, such as the file system storage 206. In some embodiments, the flusher 204 does the flushing according to a flushing policy 214 as provided by the policy engine 205. More specifically, directed by the flushing policy 214, the flusher 204 performs flushing in some appropriate flushing timing, for example when the electronic device is idle. Further, under the control of the flushing policy 214, the flusher 204 schedules cached data in the page cache 203 that is ready for flushing with reference to the journal 216.

The flusher 204 could be based on any appropriate storage component to flush any transaction atomically. Various flash data formats could be used with the flusher 204, the present disclosure has no limitation in this regard. For example, the storage management component of many file systems such as Ext4 and Btrfs can be easily adopted to support the flusher 204.

The policy engine 205 is used to provide various policies for the flushing. The policy engine 205 may be an extensible framework, so various alternative or additional policies may be used. In some implementations, the policy engine 205 provides a transaction policy 212 for the buffer manager 202 to organize buffered data into sections that are ready for flushing, i.e., determine what parts of cached data can be ready for flushing. In other words, the transaction policy 212 determines when to close an active section or transaction. The transaction policy 212 can be application-specific, which is based on a data read/write access pattern of an application.

Different applications have vastly different data read/write access patterns. For example, one application may frequently write to a same address or a same cache page in the memory, while another application may always write different addresses or cache pages in the memory. Such different data read/write access patterns could indicate different energy efficiency improvement potentials. To capture the extent to which overwritten data may improve energy efficiency, many metrics could be used to represent the energy efficiency improvement potentials. As an example, a metric of energy improvement potential ratio r is used to represent energy efficiency improvement potentials from overwriting, which is defined as $r=o/s$, where s is the data staleness which indicates the amount of dirty data in the page cache, and o is the accumulative total amount of data that has been overwritten since the last flush.

Figure 3:
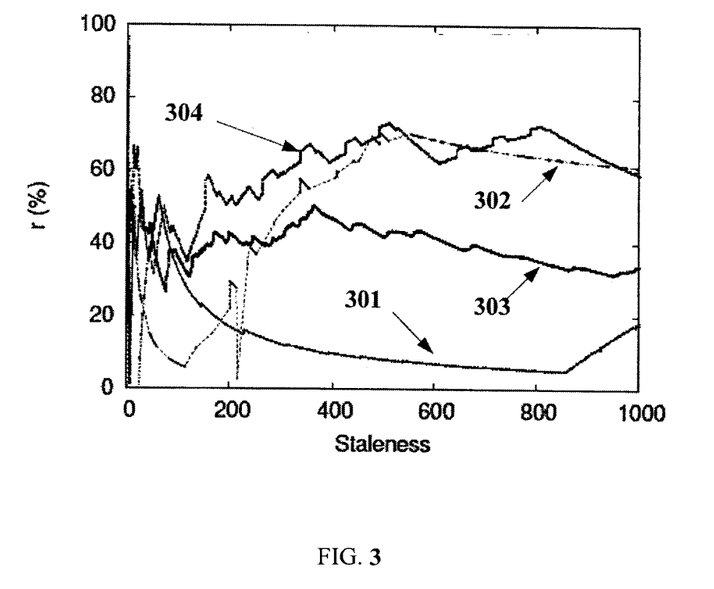
FIG. 3 illustrates energy improvement potential curves of several applications showing how the energy improvement potential ratio varies as the data staleness increases.

FIG. 3 illustrates energy improvement potential curves of several applications showing how the energy improvement potential ratio varies as the data staleness increases. In FIG. 3, X-axis represents the data staleness s, and its range is unified among applications in order to depict all curves in one chart. The range values are noted alongside application names just for a sense of data scale. Y-axis represents the energy improvement potential ratio r. Four curves are shown in FIG. 3, where Curve 301 represents a game application, Curve 302 represents a digital map application, Curve 303 represents a browser application, and Curve 304 represents a social networking application.

As seen from FIG. 3, different applications have vastly different shapes of curves, indicating vast differences in their energy improvement potentials. For example, some curves (e.g., Curve 301, 303) are rather flat, while others (e.g., Curve 302, 304) are monotonically increasing or have a gentle peak. Such diversity implies different energy improvement opportunities for these applications. For example, for an application with a peak in the curve (e.g., Curve 301), one exemplary suitable opportunity to close an active section or transaction is the peak because afterwards the energy efficiency improvement potential drops. For an application with an increasing curve (e.g. Curve 302, 304), the point at which the increasing trend becomes mild is a good opportunity to close, because beyond that point the energy efficiency improvement potential increases only little, while the stale data continues to take up more and more space in the page cache. For an application with a flat curve (e.g., Curve 303), the opportunity is quite flexible.

Thus, the transaction policy 212 can be application-aware and based on a data read/write access pattern of an application. In some implementations, the transaction policy 212 uses for example the above described energy improvement potential curve to estimate the degree of improvement possible from overwriting in the future, given the current amount of unflushed data in the page cache 203. In other words, a feature of the transaction policy 212 is to locate the peak of the energy improvement curve as possible.

In addition, isolation of application data paths in electronic devices enables the feasible of the application-aware transaction policy 212. Unlike on PCs or servers, mobile device users rarely choose where applications are installed or directly move files between directories on the device, which avoids the consistency issue of cross-app paths. Data paths of applications on such mobile devices have conventions which enable the file system to distinguish applications through paths and to automatically improve policies for different applications. In some embodiments, all data paths touched by a single application can be set as a basic unit of application adaptability.

The policy engine 205 also provides a flushing policy 214 for the flusher 204 to determine an appropriate flushing timing and to schedule the cached data that is ready for flushing. In other words, the flushing policy 214 decides when to flush which sections or transactions.

The flushing policy 214 could comprise a timing policy which decides when to flush. There are many conditions which can trigger flushing. In some aspects, the timing policy could determine a flushing timing at least partly based on user input interactions with an application of the device or with the device. In other aspects, the flushing timing policy could be based on when the device is presently in an idle state. The device may have several different states: standby, idle, and busy. "Standby" refers to when the screen of the device is turned off and the device enters a suspended condition; "idle" means that the screen is on and the device is active but without user operations or with less user operations for example lower than a predetermined threshold; and "busy" means that the screen is on and the device is active with frequent user operations for example higher than a predetermined threshold. For example, when a user reads or reflects on the screen content during an interaction, such intervals may represent beneficial times for flushing. Such intervals could be predicted in many appropriate manners. For example, in one implementation, when a degree of activity of user input interactions with an application of the device or with the device is lower than a predefined threshold, it can be decided that the device is idle and it is a beneficial time for flushing. An exemplary implementation for the timing policy will be described later.

The skilled in the art could understand that, there are some other conditions that trigger flushing regardless of whether it is a suitable time, for example, when the page cache becomes too large and the memory utilization is too high. Optionally, when the device is in standby, flushing can also be performed due to less or no impact on application responsiveness. Those conditions can be combined with the user interaction based condition as described above.

The flushing policy 214 could further comprise a scheduling policy which decides to flush which sections or transactions among those cached data that are prepared or being ready for flushing.

Normally, within an application, it may be preferable to have transactions flushed in order. So in one implementation, a general consideration for the scheduling policy is to flush as many transactions as possible during a given idle interval. Various appropriate scheduling mechanisms could be used to implement the scheduling policy. When considering pending transactions from multiple applications, a multi-priority scheduling mechanism could be employed to ensure fairness among applications and further improves flushing performance. An example implementation of the scheduling policy will be described later.

The file system storage 206 is used for storing file data permanently. The storage 206 can be implemented by any kind of non-volatile memory including but not limited to various read-only memories (ROMs), such as programmable ROM (PROM), electrically alterable ROM (EAROM), erasable programmable ROM (EPROM), and electrically erasable programmable ROM (EEPROM), flash memory, disk, and the like. As mentioned above, since the flusher 204 is not combined with a particular storage data format, the file system storage 206 could be any persistent storage with any data format.

In some embodiments, each application could have its own journal or write log 216, while the reverse-mapping component 218, the policy engine 205, and the flusher 204 could be shared among various instances of multiple applications in the file system.

Above thus has described exemplary components for implementing the flushing mechanism as disclosed herein. The skilled in the art could appreciate that the above description is merely for the purpose of illustration without suggestion of any limitations on the scope of the subject matter described herein, additional or alternative components are also possible.

Figure 4:
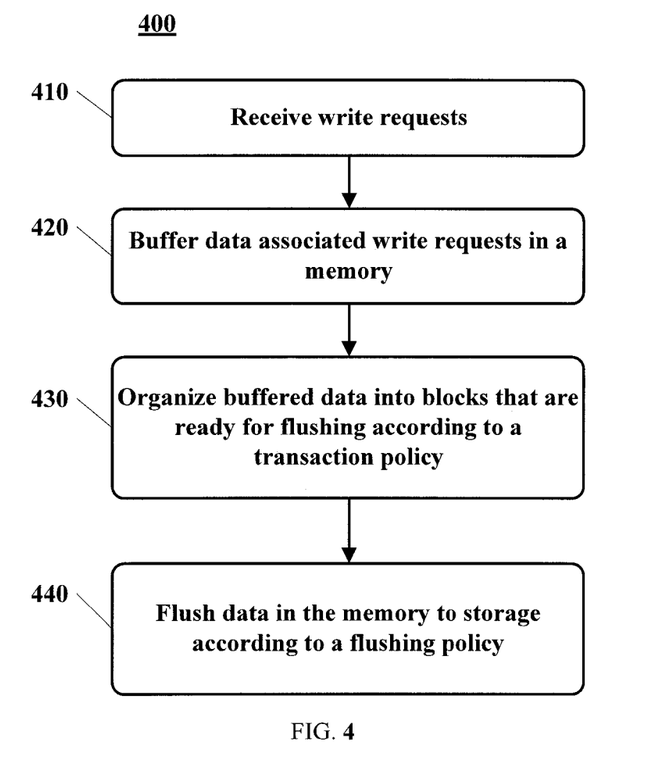
FIG. 4 illustrates a flowchart of a method for flushing data in a file system for an electronic device in accordance with embodiments of the subject matter described herein.

FIG. 4 illustrates a flowchart of a method for flushing data in a file system for an electronic device in accordance with embodiments of the subject matter described herein.

It is to be understood that the steps are not necessarily performed in the order shown in FIG. 4. Instead those steps may be performed in any other suitable orders or in parallel.

The method 400 is entered at step 410 where write requests (e.g., write requests 201 in FIG. 2) are received. Each of the write requests can be associated with an application of the device. A write request can includes information as required by this operation, such as a target page to be written to, data to be written associated with the write request, the size of the data to be written, and the like.

Figure 5:
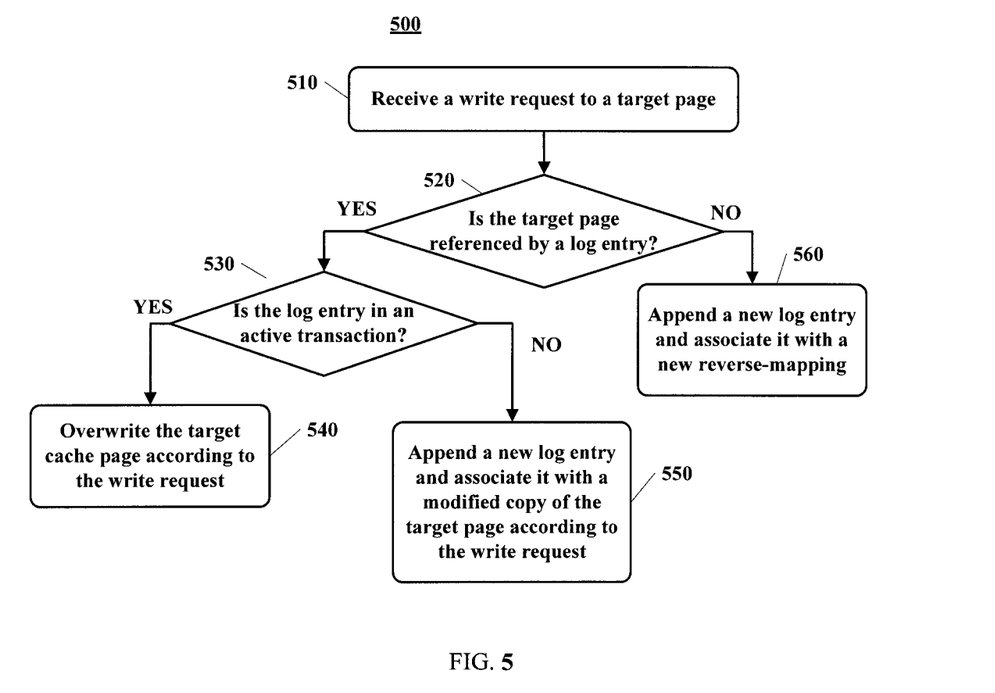
FIG. 5 illustrates an exemplary flow chart showing how to buffer the data in a memory when a write comes.

Then, at step 420, the data to be written could be buffered in a volatile memory, such as the page cache 203 as shown in FIG. 2. The data is encouraged to live in the page cache longer in order to gain energy efficiency opportunities. The pages that have been modified in page cache 203 for writing to storage are marked as "dirty". A journal such as the journal 216 as shown in FIG. 2 can be used to record the write history of an application. FIG. 5 illustrates a flow chart showing how to buffer the data in a memory when a write comes, which will be described later.

At step 430, cached or buffered data are organized into blocks that are ready for flushing. The organizing of cached data is performed by the buffer manager 202 under the control of the transaction policy 212 provided by the policy engine 205 as shown in FIG. 2.

As described previously, the transaction policy 212 is used to determine what parts of cached data can be ready for flushing. The transaction policy 212 is at least partly based on a data read/write access pattern of an application. In some embodiments, an energy improvement ratio r curve (as shown in FIG. 3) is used to indicate different energy efficiency improvement potentials of an application. Intuitively, the best point to close a transaction is the point with highest r. Thus, the goal of the transaction policy 212 is to find an appropriate write request that approaches the energy improvement optimal point as possible, in order to end or close the current active section or transaction. Each new write request could represent a point in the energy improvement ratio curve. Various appropriate manners, such as various curve fitting methods, linear fitting or higher order non-linear fitting, can be applied to find or estimate such a suitable write request or point to close an active transaction.

In some embodiments, an online method could be used to estimate whether the coming write request or point should be regarded as the suitable write request to close the current active transaction. Since the future write requests are unknown and fluctuations in the curves may lead to choose a locally optimal point, in one implementation, a linear fitting within a sliding window is used to mitigate fluctuations. For example, the linear fitting method could remember the latest k points, fit a line, and judge the peak via the gradient of the line.

Since the method for estimating a suitable write request is run on every write, its computing complexity should be simple to reduce CPU overhead and consequent energy cost. Some adjustment could be made to the linear fitting method. For example, an incremental version could be obtained from the normal linear fitting formula. They are incrementally updated for each new point, and the computation requires only a few basic arithmetic operations. Two factors may be used to control the effectiveness of this fitting method. The first is the length of the history k. A smaller k will make the fitting method more sensitive to fluctuations, while a bigger k results in long delay to detection. To confine the delay, a second factor g can be tuned. The fitting method waits until the gradient goes blow g, which is not necessarily zero.

At step 440, the flusher 204 can flush data in the memory e.g. the page cache 203 that is ready for flushing to a persistent storage e.g. the file system storage 206, according to a flushing policy 214 provided by the policy engine 205 as shown in FIG. 2.

The flushing policy 214 directs the flusher 204 to determine an appropriate flushing timing and to schedule the cached data that is ready for flushing. More detailed operations about step 440 will be described later with reference to FIG. 6.

FIG. 5 illustrates an exemplary flow chart showing how to buffer the data in a memory when a write comes. In the example shown in FIG. 5, transaction processing is employed to guarantee consistency. The skilled in the art could appreciate that, many appropriate methods could be used to buffer data, this is only for the purpose of illustration without suggestion of any limitation on the scope of the subject matter described herein. Also, it is to be understood that the steps are not necessarily performed in the order shown in FIG. 5. Instead those steps may be performed in any other suitable orders or in parallel.

The method 500 is entered at step 510 where a write request is received. The write request can be associated with an application of the device. The write request can include information as required by this operation, such as a target page to be written to, data to be written associated with the write request, the size of the data to be written, and the like.

In one embodiment, at step 520, it is checked, e.g. based on a reverse-mapping from a dirtied page in the page cache 203 to a log entry in the journal 216, whether the target page associated with the received write request has been referenced by a log entry within the journal 216 associated with the application.

If the target page is not referenced by any log entry in the journal 216, which means the application writes to a new page out of the journal 216, then at step 560, a new log entry could be appended to the current active section or transaction in the journal 216.

Meanwhile, a new reverse-mapping can be generated to associate with this new log entry.

If the target page is referenced by a log entry in the journal 216, which means the application writes to a dirty page, then the method 500 can proceed to step 530.

In one embodiment, at step 530, it is checked whether the log entry is in an active or open transaction. In response that the log entry is in an active transaction, which means a good opportunity for overwriting and the target page is not protected by any closed transaction, then at step 540, the target cache page can be directly overwritten or modified. There is no need to append a new log entry.

In response that the log entry is in a closed transaction, which means that the application writes on a dirty page that is sealed within some transaction and protected from overwriting, then in one embodiment at step 550, the file system copy-on-writes (COW) on the target page. Specifically, this target page is duplicated before written, and the log entry is changed to associated with the original copy. Then the duplicated target page can be modified according to the write request and a new log entry is appended to the current active transaction in the journal 216. Meanwhile, a new reverse-mapping can be generated to associate the modified copy of the target page with this new log entry.

Figure 6:
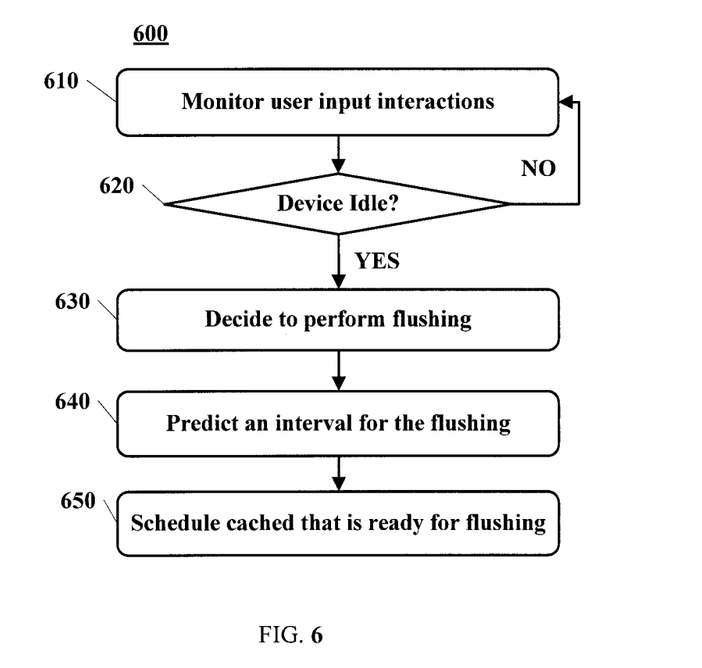
FIG. 6 illustrates an exemplary flow chart showing how a flusher can operate according to the flushing policy as disclosed herein.

FIG. 6 illustrates an exemplary flow chart showing how a flusher, e.g., the flusher 204 in FIG. 2, can operate according to the flushing policy 214 as disclosed herein.

In general, the flushing policy 214 comprises a timing policy which predicts a time interval within which the user of the device is expected not to actively operate the device, in order to find responsiveness-friendly times for flushing. The flushing policy 214 may further comprise a scheduling policy which decides to flush which transactions among those ready for flushing, especially when multiple journals associated with multiple applications have one or more closed transactions ready for flushing.

The method 600 is entered at step 610 where user interactions with an application of the device or with the device are monitored. A user input interaction could be any kinds of user operation, depending on the device. For example, for a touch screen device, a user input interaction could be all forms of screen-touch gesture, including but not limited to, tap, double tap, swipe towards a direction, rotate, pinch, unpinch, flick, multi-finger tap or scroll, and etc. In some embodiments, a filter is used to combine some events into one logic operation, because some logical user operations incur multiple screen events with small intervals, for example smaller than a predetermined threshold, such as the swiping hand-gestures.

The monitoring of user input interactions could involve when a user operation occurs, and how often a user operation occurs, and the like. Based on the monitoring, various interaction models could be used to predict the interval for flushing, including but not limited to simple straw-man solutions such as the last minimum model (LMM, which picking the minimum), or the last average model (LAM, picking the average) from among the last k measured intervals.

Figure 7:
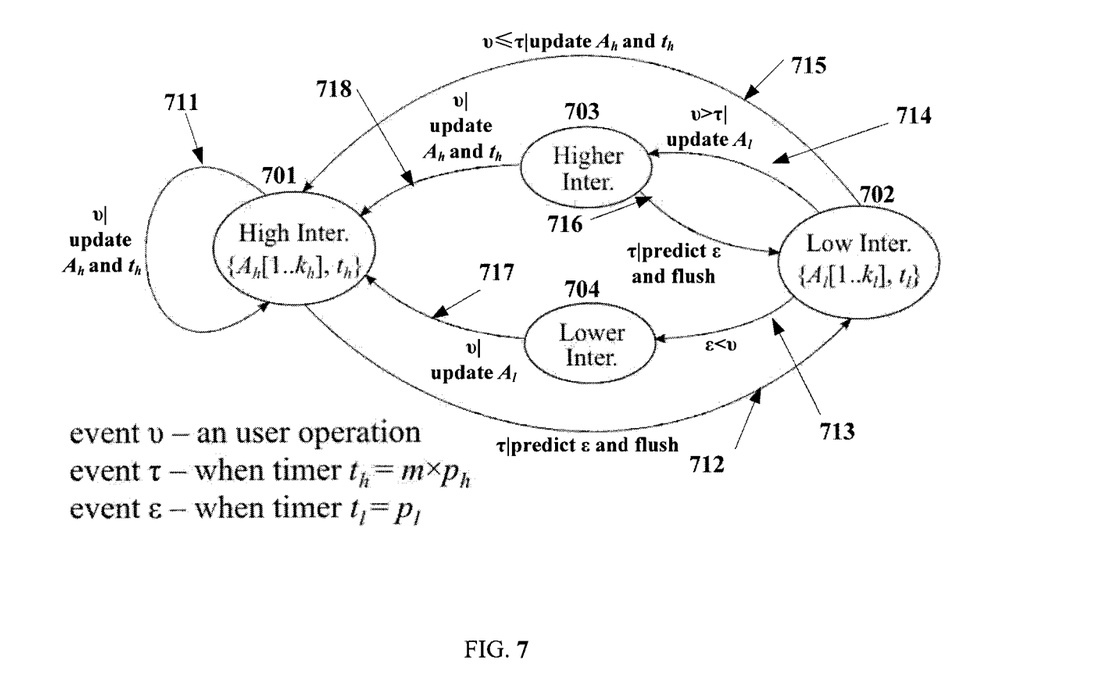
FIG. 7 illustrates a simple state-machine model for predicting an interval suitable for flushing.

FIG. 7 illustrates a simple state-machine model for predicting an interval suitable for flushing. The skilled in the art could appreciate that, the state-machine model in FIG. 7 is merely an example for the purpose of illustration without suggestion of any limitation on the scope of the subject matter described herein. Many other appropriate state-machines can be designed to predict an interval for flushing.

It can be recognized that, users of modern mobile devices such as smart phones usually switch back and forth between short and long intervals. For example, when reading News Feeds on a social networking application, the user may quickly skim some posts before then staying longer with an interesting one to read it. The finite-state machine model is based on the above recognition.

As shown in FIG. 7, there are two central states, a high-interaction state 701 when the user operates with short intervals, and a low-interaction state 702 when the user operates with long intervals. Each of the two states maintain a separate recent history of intervals A[1 ... k], and uses the average value p to predict the next interval. Each of them also possesses a timer t, which triggers a timeout when it reaches a certain value and is reset to zero on every state transition. These fields are footnoted with l or h for the two states respectively. For example, as shown in FIG. 7, the high-interaction state 701 maintains a history of intervals $A_h[1 \ldots k_l]$ and a timer $t_h$; and the low-interaction state 702 maintains a history of intervals $A_l[1 \ldots k_l]$ and a timer $t_l$. Two additional intermediate states, a higher-interaction state 703 and a lower-interaction state 704, are used to help to increase or decrease interval predictions.

In the state machine model as shown in FIG. 7, edges or arrows show the transitions from one state to another. Each arrow is labeled with the input that triggers that transition and the action to be taken. As seen from the state diagram shown in FIG. 7, the state machine works as follow: while staying in the high-interaction state 701 ("h"-state for short), it will loop if the coming event is a user operation, as indicated by a circular arrow 711. However, if the user operation does not come before a timeout event r, the machine assumes that the user may begin a long interval, and so it changes to the low-interaction state 702 ("l"-state for short). This transition is indicated by the arrow 712. In "l"-state 702, if the predicted time $p_l$ successfully passes without user interaction, the state machine enters the lower-interaction state 704 that waits for a user operation, thereby increasing the long-interval prediction. This transition is indicated by the arrow 713. If a user operation comes before the predicted time but later than r, it is considered that the user still operates with long interval but the long-interval prediction should be decreased, so it goes into the higher interaction state 703. This transition is indicated by the arrow 714. Otherwise, the user operation comes so quickly (before r) that it is estimated that the user switches to short intervals, then the state is directly set to the high interaction state 701. This transition is indicated by the arrow 715. Other operations can be clear from the state diagram as shown in FIG. 7, and thus the detailed description thereof is omitted here.

From the state diagram, it can be seen that, there are two opportunities to perform the flushing, which are indicated by the arrow 712 and the arrow 716 respectively. The length of the interval for flushing is predicted by the average value p.

Return back to FIG. 6. At step 620, it is determined whether or not to do flushing at least partly based on the monitoring at step 610 and the adopted interval prediction model (e.g., the state-machine model as shown in FIG. 7). In other words, it is determined whether the device is in an idle state, that is, the screen is on and the device is active but with no user operations or with less user operations, for example being lower than a predetermined threshold. If the device is idle, it implies a good time for flushing, and then the method 600 proceeds to step 630 where it is decided to perform flushing. Otherwise, the method 600 can go back to step 610 to monitor the user input interactions.

As mentioned previously, there are some other conditions which can trigger flushing. For example, some other conditions could be taken into account, which trigger flushing regardless of whether it is a suitable time, for example, when the page cache becomes too large and the memory utilization is too high. Those conditions can be combined with the user interaction based condition as described above.

Having decided to perform flushing, at step 640, a length of the interval for flushing can be predicted. Although for the purpose of illustration, step 640 is shown after step 630, the skilled in the art could appreciate that, the length of the interval can be predicted or estimated when determining whether a suitable interval occurs based on various interaction models. In some embodiments, the finite-state machine model as shown in FIG. 7 is used to predict the interval, where an average value p is used to predict the length of the interval.

Then, at step 650, the data in the page cache that is ready for flushing can be scheduled according to a scheduling policy as provided by the policy engine 205 as shown in FIG. 2.

In general, the scheduling policy decides to flush which sections or transactions among those cached data that are prepared or being ready for flushing. Normally, within an application, transactions have to be flushed in order. So, a general consideration for the scheduling policy is to flush as many transactions as possible during a given idle interval. Various appropriate scheduling mechanisms could be used to implement the scheduling policy. When considering pending transactions from multiple applications, a multi-priority scheduling mechanism could be employed to ensure fairness among applications and further improves flushing performance. In typical scenario for such embodiments can be that a user is interacting with an application while listening to music radio, and the background email or news services continuously receive push messages.

The scheduling policy can be at least partly based on one or more attributes of the transactions, such that proper transactions can be chosen in a fair and energy efficient way. The attribute of a transaction include one or more of the following: a state of a transaction, a length of a transaction, an affinity of a transaction, and an age of a transaction.

The state of a transaction includes an active state and a closed state. As described previously, only closed transaction could be scheduled for flushing.

The length of a transaction refers to the number of pages to flush for the transaction. Based on the length, the time required to flush one transaction can be estimated, and thereby it can be judged whether the transaction can fit into the current predicted interval to avoid any possible conflict that affects application responsiveness, e.g., a flush operation overlaps with an interactive user operation.

The affinity of a transaction indicates whether two or more transactions belong to a same application. Transactions of the same application have affinity, because they can be merged thus saving energy if they are flushed together. In other words, two or more consecutive transactions having affinity can be merged into one before flushing in order to extend the energy improvement scope.

The age of a transaction can be represented by the number of times a transaction has previously been skipped because it was not fit in any interval. For fairness, it is not desirable that some applications transactions remain unflushed for too long.

Various scheduling methods can be used to schedule the transactions to be flushed based on the above attributes of transactions. One approach is priority based scheduling method. For example, the following four priority considerations can be used, where lower number means higher priority.

Figure 8:
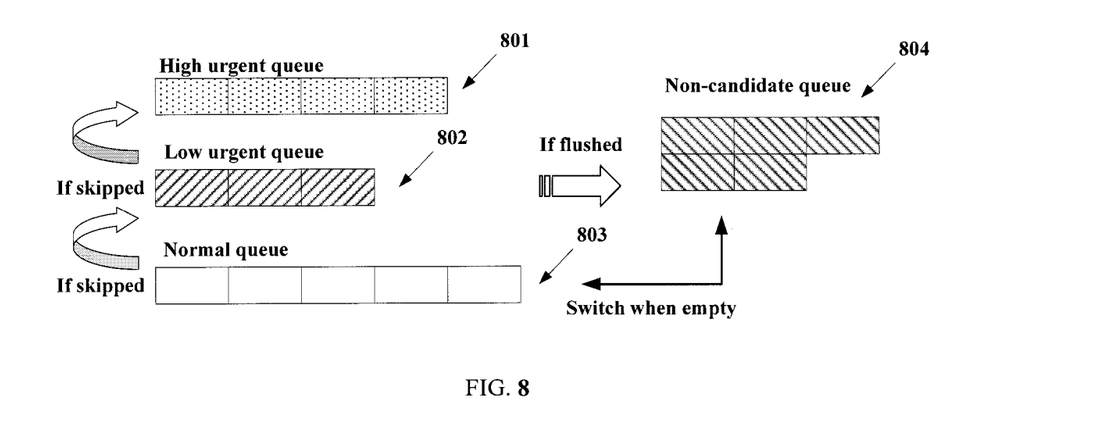
FIG. 8 shows an exemplary priority-based scheduling mechanism.

Consideration 1 (transaction affinity): whenever a transaction is chosen, other transactions of the same application are prioritized over the rest. For simplicity, application is directly used as the unit of scheduling thereinafter. Note that other transactions than the head one of an application are not under consideration except when the application is chosen. Various appropriate data structures can be adopted to organize the waiting applications. FIG. 8 shows an exemplary data structure for organizing the waiting applications.

As shown in FIG. 8, there are three candidate queues, high urgent queue 801, low urgent queue 802, and normal queue 803, and a non-candidate queue 804. Each frame in the queue represents an application. The three candidate queues 801, 802, and 803 form a way to batch together transactions of similar age. Whenever an application is skipped in a queue, it is removed from the queue and put into the more urgent queue if there is one.

Consideration 2 (transaction age): for the three candidate queues 801, 802, and 803, applications from more urgent queues are prioritized over applications from less urgent queues. When there is no feasible choice in the candidate queues, the shortest one in the high urgent queue could be selected to flush.

Consideration 3 (transaction length): an application in the candidate queue is feasible to flush only when its head transaction's length is shorter than the available interval.

Consideration 4 (queue replenishment): when an application in any queue has closed transactions, it is added to the normal queue. When all three candidate queues are empty, all applications in the non-candidate queue move to the normal queue.

Above thus has described a file system with adaptive flushing for an electronic device. The file system keeps data in memory much longer and its policy for flushing in-memory write cache to storage is application-aware and adaptive. In one aspect, what parts of the cached data are ready for flushing could be determined according to the access characteristic of an application, which reflects application-adaptability. In another aspect, the flushing timing can be selected flexibly at least partly based on user input interactions with an application of the electronic device or with the electronic device, which reflects user-adaptability. Further, a multi-priority scheduling mechanism for scheduling data units that are ready to be flushed could be employed, which ensures fairness among applications and further improves flushing performance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the disclosure is susceptible to various modifications and alternative constructions, certain illustrated embodiments thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the invention. Aspects of any of the embodiments described above may be combined with aspects of any of the other embodiments described to form further embodiments without losing the effect sought

What is claimed is:

1. A method implemented at least in part by an electronic device, comprising:
    receiving write requests, each of the write requests being associated with an application of the electronic device;
    buffering data associated with the write requests in a memory; and
    organizing buffered data into sections that are ready for flushing according to a transaction policy, wherein the transaction policy is at least partly based on an access characteristic of the application, wherein the access characteristic of the application includes a data read/write access pattern of the application, and wherein boundaries of the sections are determined according to the data read/write access pattern of the application associated with the write requests, such that an energy improvement degree for a closed section is higher than a predetermined threshold; and flushing sections that are ready for flushing to store them to storage according to a flushing policy, wherein the flushing policy is at least partly based on one or more of the following:
a state of user interaction with the electronic device, and a state of the electronic device.

2. The method of claim 1, wherein flushing sections that are ready for flushing comprises:
determining a flushing timing at least partly based on user input interactions with the application of the electronic device or with the electronic device.

3. The method of claim 2, wherein flushing sections that are ready for flushing further comprises:
scheduling sections that are ready for flushing at least partly based on an attribute of a section.

4. The method of claim 2, wherein determining a flushing timing comprises:
monitoring user input interactions with an application of the electronic device or with the electronic device;
deciding to perform flushing if a degree of activity of the user input interactions is lower than a predetermined threshold; and
predicting an interval for the flushing based on a history of user interactions.

5. The method of claim 3, wherein the attribute of a section includes one or more of the following:
a state of a section;
an affinity of a section;
a length of a section; and
an age of a section.

6. The method of claim 1, wherein buffering data associated with the write requests in a memory comprises:
maintaining a journal associated with an application in response to received write requests, wherein a log entry in the journal references a cache unit of the memory according to a write request; and
maintaining a reverse mapping from a referenced cache unit to a log entry within a journal; and
wherein organizing buffered data into sections comprises:
grouping log entries in the journal into transactions according to the transaction policy for keeping different versions of buffered data.

7. The method of claim 6, wherein buffering data associated with the write requests in a memory further comprises:
checking, based on the reverse mapping, whether a target cache unit associated with a received write request has been referenced by a log entry within the journal; and
in response that the target cache unit is not referenced by any log entry in the journal, appending a new log entry to the journal;
in response that the target cache unit is referenced by a log entry in a closed transaction in the journal, appending a new log entry to the journal, the new log entry being associated with a modified copy of the target cache unit according to the received write request; and
in response that the target cache unit is referenced by a log entry in an open transaction, overwriting the target cache unit according to the received write request.

8. The method of claim 1, wherein flushing the sections that are ready for flushing comprises:
storing the sections to persistent storage according to the flushing policy.

9. A system for controlling flushing in a file system for an electronic device, comprising:
at least one processor; and
memory including instructions that, when executed by the at least one processor, cause the at least one processor to perform operations to:
manage buffering of data associated with a write request in a memory, wherein the write request is associated with an application of the electronic device;
flush buffered data in the memory to store it to storage;
provide a transaction policy and a flushing policy, wherein the transaction policy is at least partly based on an access characteristic of the application, and the flushing policy is at least partly based on one of a user interaction with the electronic device or a state of the electronic device;
organize buffered data in the memory into sections that are ready for flushing according to the transaction policy, wherein the access characteristic of the application includes a data read/write access pattern of the application, and wherein boundaries of the sections are determined according to the data read/write access pattern of the application associated with the write request, such that an energy improvement degree for a closed section is higher than a predetermined threshold; and
flush sections that are ready for flushing according to the flushing policy.

10. The system of claim 9, wherein the instructions to flush sections that are ready for flushing include instructions that cause the at least one processor to perform operations to:
determine a flushing timing at least partly based on user input interactions with the application of the electronic device or with the electronic device.

11. The system of claim 10, wherein the instructions to flush sections that are ready for flushing include instructions that cause the at least one processor to perform operations to:
schedule sections that are ready for flushing at least partly based on an attribute of a section.

12. The system of claim 10, wherein the instructions to determine a flushing timing include instructions that cause the at least one processor to perform operations to:
monitor user input interactions with an application of the electronic device or with the electronic device;
decide to perform flushing if a degree of activity of the user input interactions is lower than a predetermined threshold; and
predict an interval for the flushing based on a history of user interactions.

13. The system of claim 11, wherein the attribute of a section includes one or more of the following:
a state of a section;
an affinity of a section;
a length of a section; and
an age of a section.

14. The system of claim 9, further comprising instructions that cause the at least one processor to perform operations to:
maintain a journal associated with an application in response to received write requests, wherein a log entry in the journal references a cache unit of the memory according to a write request;
maintain a reverse mapping from a referenced cache unit to a log entry within a journal; and
organize buffered data into sections by grouping log entries in the journal into transactions according to the transaction policy for keeping different versions of buffered data.

15. The system of claim 14, wherein the instructions to manage buffering of data include instructions that cause the at least one processor to perform operations to:
- check, based on the reverse mapping, whether a target cache unit associated with a received write request has been referenced by a log entry within the journal; and
- in response that the target cache unit is not referenced by any log entry in the journal, appending a new log entry to the journal;
- in response that the target cache unit is referenced by a log entry in a closed transaction in the journal, appending a new log entry to the journal, the new log entry being associated with a modified copy of the target cache unit according to the received write request; and
- in response that the target cache unit is referenced by a log entry in an open transaction, overwriting the target cache unit according to the received write request.

16. The system of claim 9, further comprising instructions that cause the at least one processor to perform operations to store the buffered data in the memory into persistent storage.

17. A non-transitory computer storage medium having computer-executable instructions, which when executed perform actions for flushing data in an electronic device, the actions comprising:

- receiving write requests, each of write requests being associated with an application of the electronic device;
- buffering data associated with the write requests in a memory; and
- maintaining different versions of the buffered data by grouping the write requests at least partly based on an access characteristic of the application, wherein the access characteristic of the application includes a data read/write access pattern of the application;
- dividing the buffered data into sections, wherein boundaries of sections are determined according to the data read/write access pattern of the application associated with the write requests, such that an energy improvement degree for a closed section is higher than a predetermined threshold; and
- flushing the different versions of the buffered data to store them to storage at least partly based on one or more of the following:
  - a state of user interaction with the electronic device, and a state of the electronic device.

* * * * *